United States Patent [19]
Bich et al.

[11] Patent Number: 5,293,730
[45] Date of Patent: Mar. 15, 1994

[54] AUGER FINGER CONTROL MECHANISM

[75] Inventors: Gary L. Bich; Larry D. Hall, both of New Holland, Pa.

[73] Assignee: Ford New Holland, Inc., New Holland, Pa.

[21] Appl. No.: 44,660

[22] Filed: Apr. 12, 1993

[51] Int. Cl.$^5$ ............................................ A01D 41/00
[52] U.S. Cl. ...................... 56/10.2; 56/14.6
[58] Field of Search ................ 56/53, 10.2, 14.4–14.6

[56]  References Cited
U.S. PATENT DOCUMENTS

| | | |
|---|---|---|
| 2,644,292 | 7/1953 | Oberholtz et al. |
| 2,701,634 | 2/1955 | Carroll . |
| 2,832,187 | 4/1958 | Johnson . |
| 2,836,026 | 5/1958 | Gray et al. |
| 3,474,602 | 10/1969 | Molzahn . |
| 4,270,339 | 6/1981 | Wolfe ................................ 56/53 X |
| 4,271,660 | 6/1981 | Kloefkord et al. ................ 56/14.6 |
| 4,583,354 | 4/1986 | Kracl ................................ 56/14.6 X |
| 4,663,921 | 5/1987 | Hagstrom et al. ................ 56/14.6 |
| 4,739,774 | 4/1988 | Heidjann .......................... 56/14.6 X |

OTHER PUBLICATIONS

Ford New Holland, Inc. Brochure on 16—18 Baler—1991.

*Primary Examiner*—Thuy M. Bui
*Attorney, Agent, or Firm*—Frank A. Seemar; Larry W. Miller

[57]  ABSTRACT

A crop gathering attachment for an agricultural harvester having a rotatable auger-like conveyor for transporting crop material, a stationary crank shaft mechanism enclosed in the conveyor and having a shaft portion disposed eccentrically and parallel to the rotational axis of the conveyor, and a retractable finger arrangement comprising a plurality of finger members pivotally connected at their inner ends to the shaft portion and projecting outwardly through guiding members provided in the peripheral wall of the conveyor. The finger arrangement is timed such that due to the eccentric disposition of the shaft portion, the finger members are reciprocated relative to the conveyor wall upon rotation of the conveyor, thereby protruding from the wall at one side of the conveyor for projecting into the crop material and being retracted relative to the wall at the generally diametrically opposed side of the conveyor for releasing the transported crop. A unique actuator is operatively connected to the crank shaft mechanism for remotely controlling the position of the shaft portion relative to the conveyor and thereby varying the timing of the finger members.

7 Claims, 5 Drawing Sheets

AUGER FINGER CONTROL MECHANISM

FIELD OF THE INVENTION

The present invention relates generally to crop gathering attachments or headers for agricultural harvesting machines and more specifically, although not exclusively, to crop pick-up devices for forage harvesters comprising crop consolidating auger conveyors provided with retractable fingers.

BACKGROUND OF THE INVENTION

A crop consolidating auger for a pick-up attachment usually extends the full width of the attachment and is provided with oppositely wound auger flights for gathering and consolidating the crop material in the central region of the auger from where the crop is conveyed towards processing means including, e.g., a comminuting rotor when the attachment is mounted on a forage harvester. Retractable fingers embodied in the auger, at least in the central region thereof, are a well known expedient for assisting the transfer of crop material from the pick-up device to the crop processing machine to which the device is attached.

Normally, such retractable fingers are carried on bearings which rotate on the eccentric part of a crank shaft mechanism which is coaxial with the rotational axis of the auger conveyor. The timing of the arrangement is such that, during operation, the fingers are protruding from the auger body to their maximum possible extent when oriented to the crop collecting side, i.e., the front side of the pick-up device, whereas the fingers are fully retracted when directed to the crop releasing side. In so doing, crop material lifted from the ground and presented to the consolidating auger, at least in the central portion thereof, is aggressively engaged by the protruding fingers and positively urged rearwardly where other crop transporting means are operable, such as forage harvester feed rolls or an elevating conveyor in a combine harvester feeder house.

Retractable finger arrangements of the type described is conventional in the art. For example, see U.S. Pat. No. 2,701,634, the content of which is incorporated herein by reference.

It has been experienced however that the above described finger timing position relative to the auger body is not always the best suited for all types of crops and crop conditions. Depending on, e.g., crop length, moisture content or degree of ripeness, different timing positions of the retractable fingers may be desirable in order to optimize transfer of crop material. In the arrangement shown in U.S. Pat. No. 2,701,634, mentioned above, means are provided to move the eccentric shaft relative to the pivot axis of the auger whereby a different timing position of the retractable fingers can be preset. However, among other things, this prior art arrangement suffers from the critical disadvantage that any adjustment of the finger orientation has to be performed while the harvester and attachment are inactive, meaning that the result of an adjusted finger setting is not immediately ascertainable. This leads to continuous periods of inoperation until the optimum timing is set for the existing crop conditions. Also, as crop conditions in a same field may vary widely, repeated trial and error adjustments of the finger orientation may be required leading to undesirable periods of downtime.

In addition to the above problems, crop gathering attachments occasionally become plugged due to a lump of crop material wedging between crop handling elements to the extent that it prevents normal operation. To obviate the need of manual unplugging, harvesters are commonly provided with a drive reversing mechanism which allows for reversing rotation of the crop conveying and processing means in order to evacuate the obstruction towards the front of the harvester, i.e., in a direction opposite to crop flow during normal operation. However, in the transitional area between the harvester base unit and its attachment, the auger fingers are completely retracted in the auger body, which is the normal position for the fingers during operation of the auger for releasing the transported crop appropriately. As a result, even with reverse mode available, plugging occurs necessitating shutdown to enable the operator to clear out the plug located in the transitional area.

SUMMARY OF THE INVENTION

An important objective of the present invention is to overcome the above mentioned disadvantages by providing a simple and effective device which allows on-the-go adjustment of the retractable finger orientation over a wide range of positions in forward and reverse drive.

In pursuance of this and other important objects the present invention provides for a crop gathering attachment having a rotatable auger-like conveyor for transporting crop material, a stationary crank shaft mechanism enclosed in the conveyor and having a shaft portion disposed eccentrically and parallel relative to the rotational axis of the conveyor, a retractable finger arrangement comprising a plurality of finger members pivotally connected at their inner ends to the shaft portion and projecting outwardly through guiding members provided in the peripheral wall of the conveyor, the arrangement being timed such that due to the eccentric disposition of the shaft portion, the finger members are reciprocated relative to the conveyor wall upon rotation of the conveyor, thereby protruding from the wall at one side of the conveyor for projecting into the crop material and being retracted relative to the wall at the generally diametrically opposed side of the conveyor for releasing the transported crop, and an actuator operatively connected to the crank shaft mechanism for remotely controlling the position of the shaft portion relative to the conveyor thereby varying the timing of the finger members.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
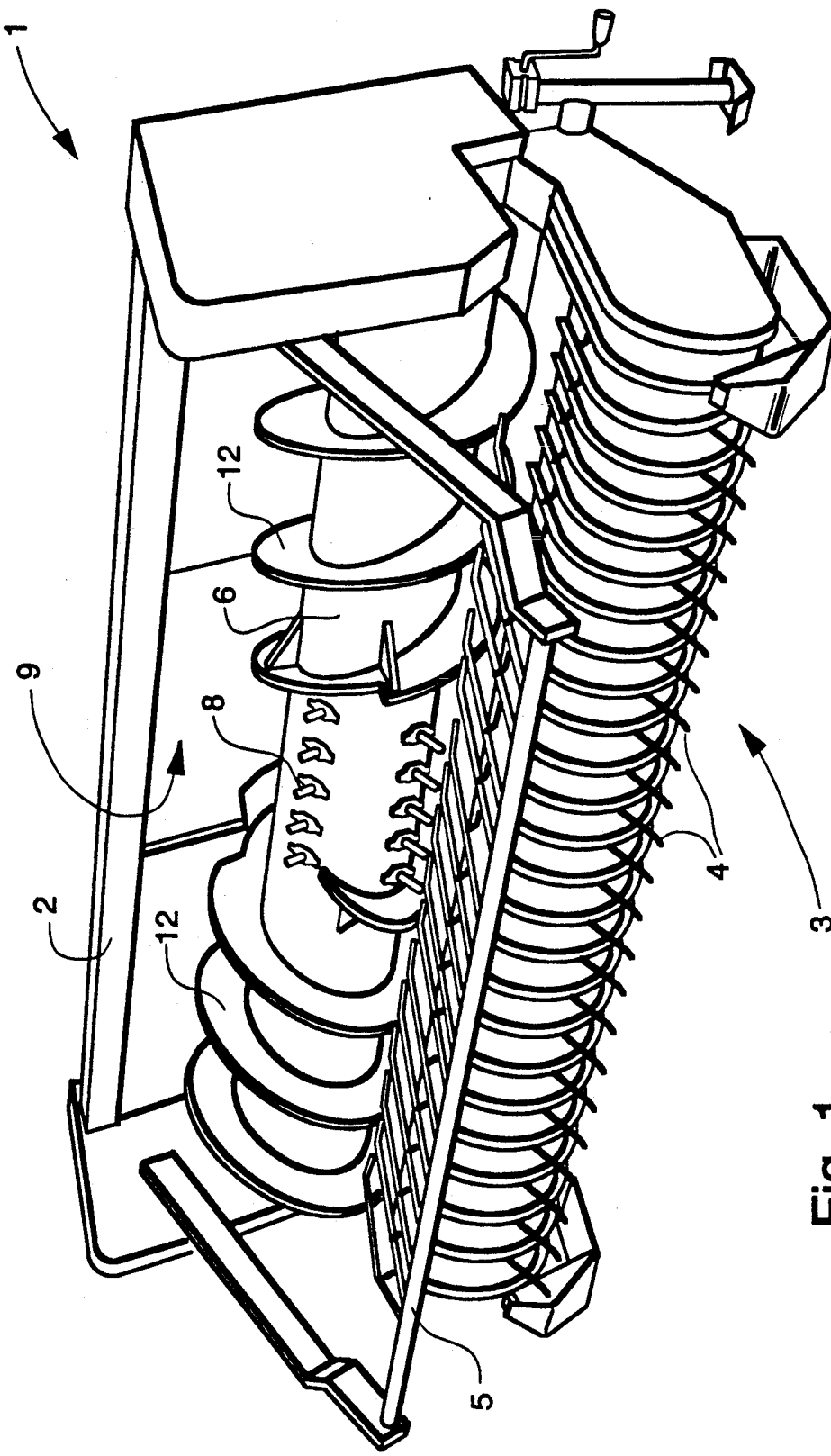
FIG. 1 is a perspective view of a crop pick-up attachment for a forage harvester.

Referring now to FIG. 1, a crop gathering attachment 1 for a forage harvester is shown comprising a frame 2, a conventional pick-up device 3 with rotatable tines 4 for lifting the crop from the ground, a so called "wind guard" 5 for restricting upward movement of the crop and a crop consolidating auger 6 having retractable fingers 8. Auger 6 is operable to convey the crop through a central opening 9 in the rear side of frame 2 towards further processing means, such as feed rolls 44 (shown schematically in FIGS. 3 and 4) of a forage harvester (not shown).

Figure 2:
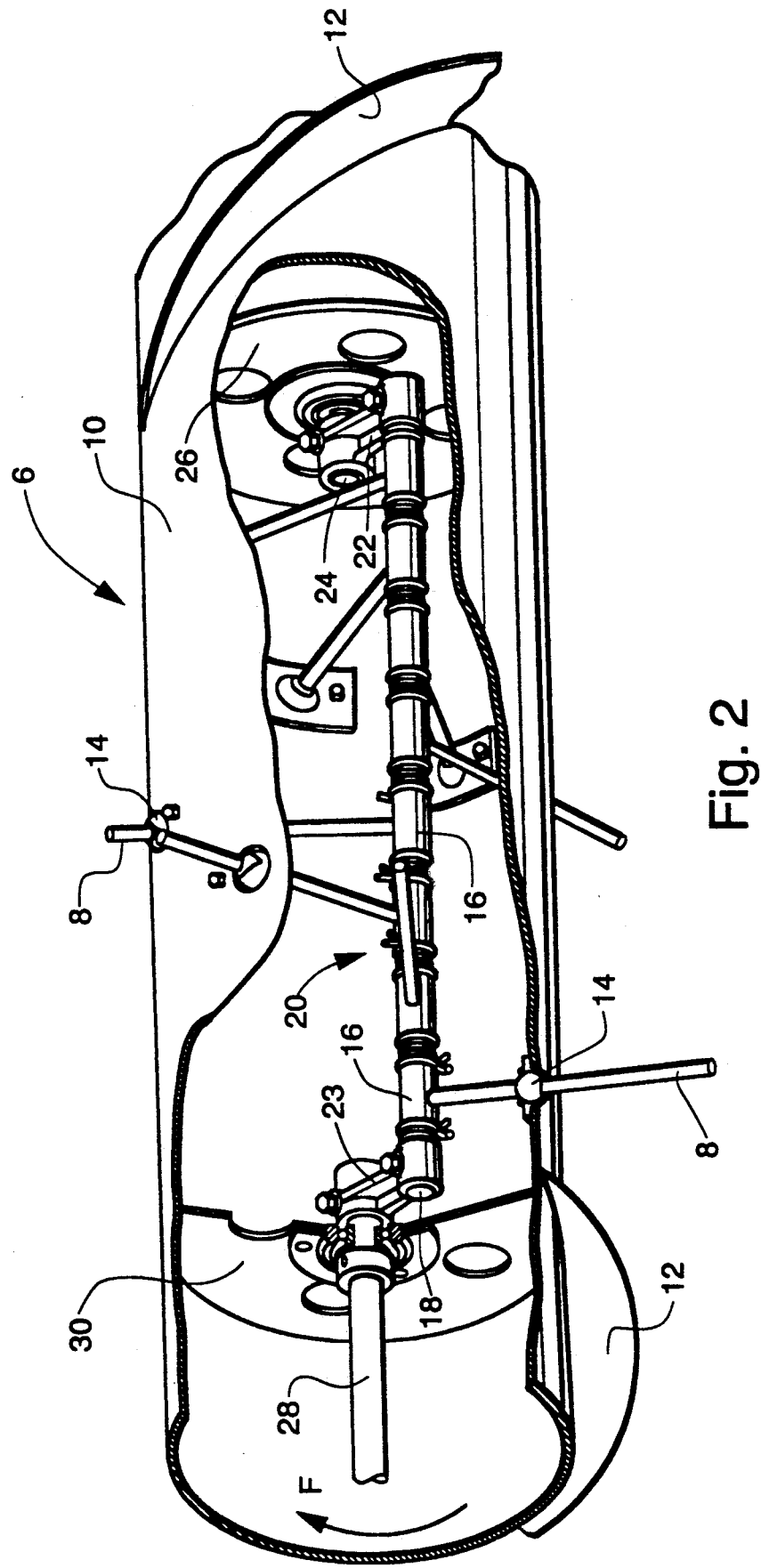
FIG. 2 is a partial perspective view of a crop consolidating auger with parts of the exterior surface removed to show the interior crank shaft mechanism which controls the position of the retractable fingers.

Turning now to FIGS. 1 and 2, auger 6 includes a tubular body portion 10 which carries oppositely wound, auger-like conveyor flights 12 at each end which consolidate the gathered crop at a central region of the auger 6 upon rotation thereof. The retractable fingers 8 are disposed at the central region of auger 6 and are operable to project into the gathered crop and propel it rearwardly towards the feed rolls of the harvester.

Fingers 8 are rod-shaped members slidably fitted through guide members 14 in auger body 10 and are rotatably journaled by cylindrical bearings 16 to a finger shaft 18, forming part of a stationary crank shaft mechanism, generally designated by reference numeral 20. Fingers 8 may be provided in equally spaced rows (as shown in FIG. 1) or alternatively may be staggered uniformly about the periphery of the auger body 10 (as shown in FIG. 2). Finger shaft 18 is eccentrically disposed in auger body 10 on a pair of crank arms 22 and 23. The crank arm 22 is secured to a stub shaft 24 which is anchored by a bearing in a wall plate 26 mounted solidly within the auger tube 10. The other crank arm 23 is secured to an elongated shaft 28 which passes through a bearing in a second wall plate 30, also solidly mounted in auger body 10. Shaft 28 extends to the right hand side of the attachment 1, as seen in the direction of forward travel, where it is anchored against rotation to frame 2. Stub shaft 24 and shaft 28 are in line with each other and disposed coaxially relative to the rotational axis of auger 6. Accordingly, crank shaft mechanism 20 remains fixed with relation to the attachment frame 2 when auger 6 is rotated.

As auger 6 rotates in the direction of arrow F, fingers 8 are rotated about finger shaft 18 and are reciprocated in guide members 14 due to the eccentricity of the finger shaft 18 with respect to auger body 10. The arrangement is timed so that, upon rotation of auger 6, fingers 8 extend and project forwardly into the crop material delivered by the pick-up device 3, sweeping the crop under auger 6, and then retract within the body of auger 6 in order to assist in releasing the crop material for facilitating the takeover thereof by feed rolls 44.

As the arrangement of the parts and the mode of operation so far described is conventional in the art, it furthermore will be appreciated that the right hand side of auger 6 is rotatably supported on the shaft 28 whereas the left hand side thereof is provided with a stub shaft (not shown) coupled to a suitable drive mechanism (also not shown) for rotating auger 6 during operation.

Figure 3:
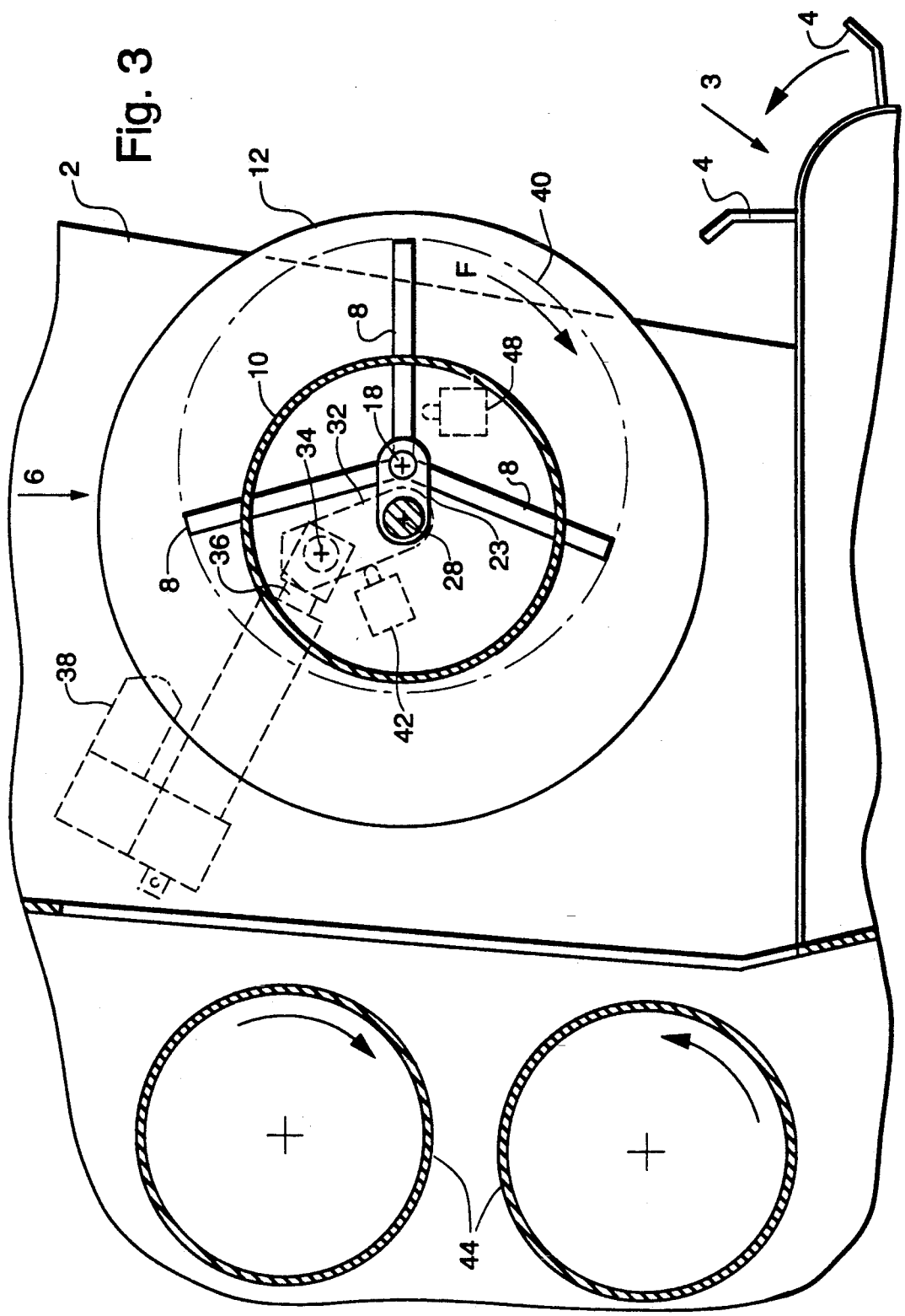
FIG. 3 is a diagrammatic side view of the pick-up attachment as seen from the right side of FIG. 1 in relation to feed rolls of a forage harvester, the arrangement being shown in the normal drive condition.

As shown seen in FIG. 3, the free end of shaft 28 is fixedly secured to a crank arm 32, the distal end of which is attached at 34 to a rod 36 of an actuator 38, driven either electrically or hydraulically. It readily will be appreciated that different settings of crank arm 32, via shaft 28 and its interior crank arm 23, result in different positions of finger shaft 18 relative to auger body 10. The disposition of the parts shown in FIG. 3 corresponds to the timing of retractable fingers 8 during normal operative conditions wherein said fingers 8 are protruding from auger body 10 when directed to the crop receiving side of attachment 1 and are retracted within auger body 10 at the diametrically opposed side thereof. The cylindrical outline generated by the tips of fingers 8 when driven in the direction of arrow F is schematically represented by the dashed line 40. A limit switch 42, adjustably positioned on frame 2, is operable to restrict the retraction stroke of actuator rod 36 by cutting the current to the actuator motor when the switch 42 becomes engaged by crank arm 32 when in the position shown in FIG. 3. In so doing, retraction movement of the actuator 38 beyond a workable position is prevented.

A multi-position switch (not shown) provided in the operator's cab allows for a remotely controlled energizing of the actuator 38 in the one or other direction thereby changing the relative position of finger shaft 18 and as such enabling on-the-go adjustments of the timing of retractable fingers 8 whenever required, e.g., changed crop conditions.

Figure 4:
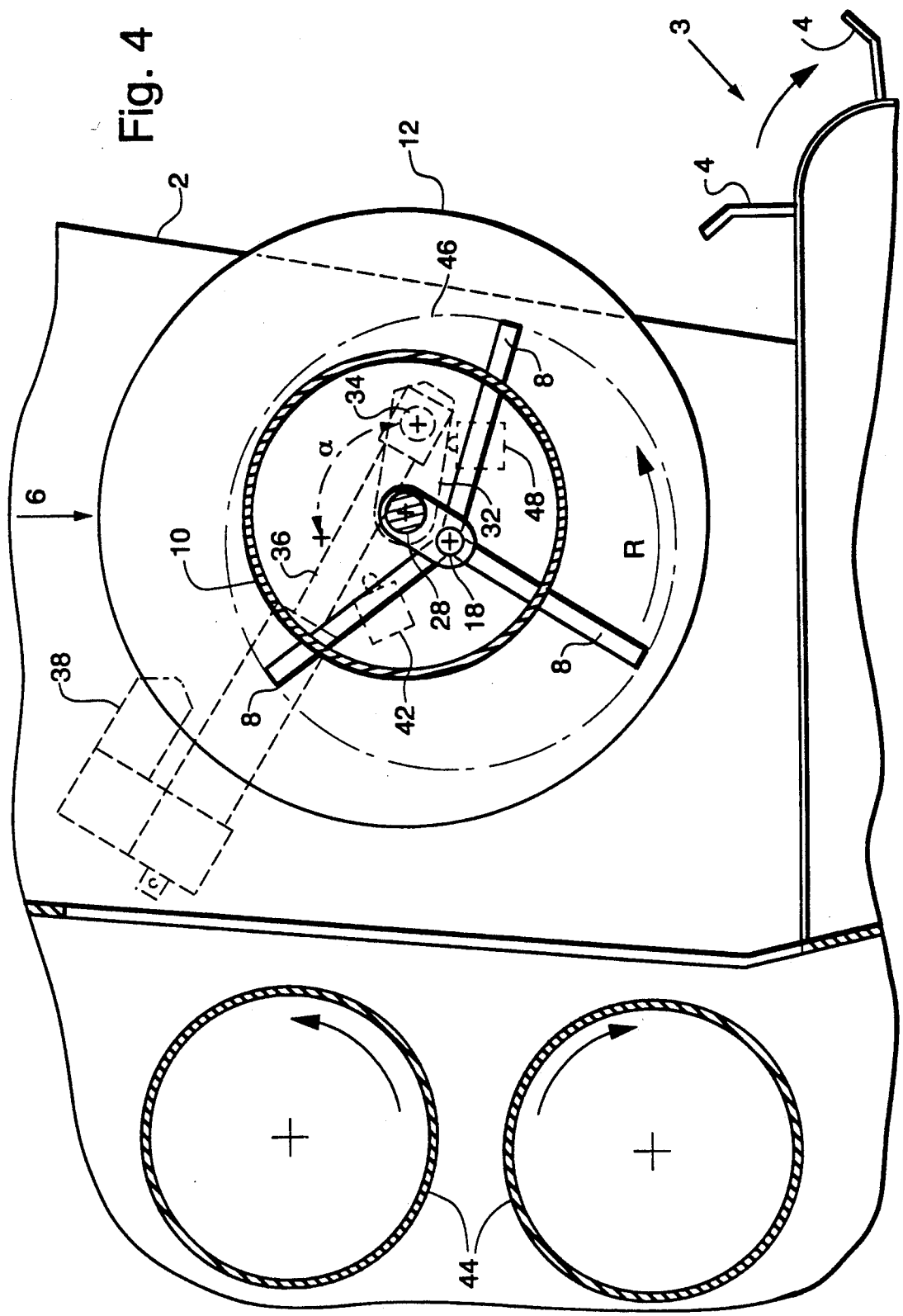
FIG. 4 is a view similar to FIG. 3 but showing the arrangement in the reverse drive condition.

The arrangement shown in FIG. 4 corresponds to the situation in which an unplugging of the harvester is taken place. It will be seen that the drive direction of feed rolls 44 and pick-up device 3 is reversed, as well as the direction of auger 6, indicated by arrow R. When comparing FIG. 4 with FIG. 3, it will be noticed that rod 36 of actuator 38 has been extended to a degree for effecting the anchoring point 34 to crank arm 32 being swung over an arc $a$, resulting in finger shaft 18 equally being rotated in a clockwise direction, as seen in FIG. 4, over the same arc $a$. As a consequence, outline 46 described by the fingers 8 is shifted generally to the lower rear side of auger 6 meaning that fingers 8 now are extended so they can assist in the removal of plugged crop material in the transitional area between feed rolls 44 and auger 6. A limit switch 48, also adjustably mounted, is operable to define the maximum extended position of actuator rod 36.

It will be clear that although in the depicted arrangement arc $a$ is approximately 120°, the position of limit switches 42 and 48 may be varied so as to obtain either a smaller or a larger angle, respectively reducing or increasing the stroke of actuator 38. By providing another kind of link arrangement between actuator 38 and crank arm 32, angles of 180° and even more are obtainable so that finger shaft 18 can be set in diametrically opposed working positions.

By using known expedients, limit switches 42 and 48 could be built into actuator 38 or replaced by adjustable potentiometers built into actuator 38, which potentiometers would be operable to directly define and restrict the working stroke of actuator rod 36.

Figure 5:
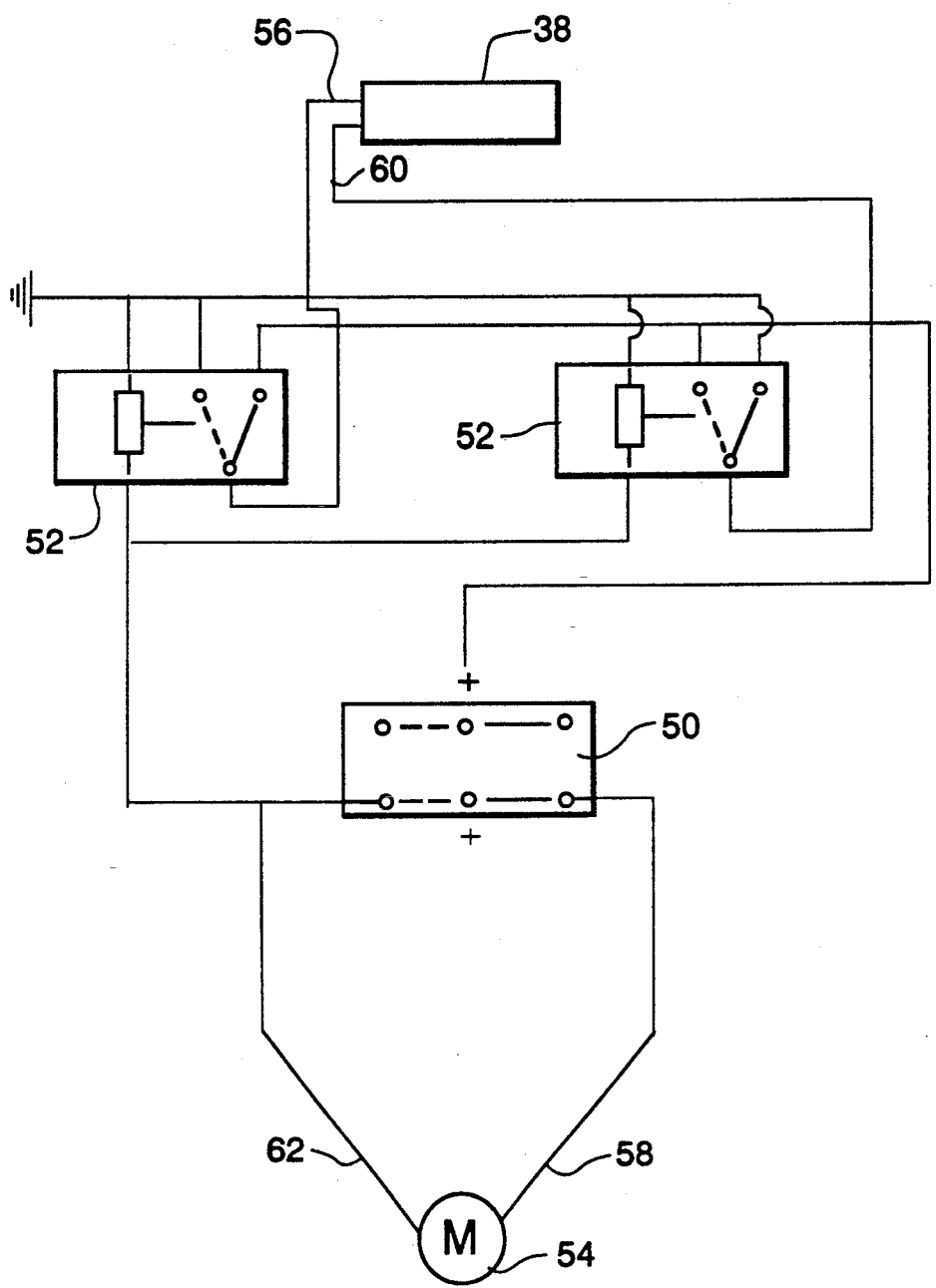
FIG. 5 shows an electrical wiring diagram for controlling the retractable auger fingers.

As mentioned above, the timing of retractable fingers 8 is remotely controlled by a switch provided in the operators cab, allowing for variable adjustment of the arrangement on-the-go. However, for unplugging purposes, fingers 8 can be shifted directly to their extreme reversed position. In order to obviate the need for the operator to first bring fingers 8 to their rearwardly extended position and then command the drive reversal of the crop intake components, such as auger 6, for starting an unplugging operation, the control circuit shown in FIG. 5 provides a switch 50 (in addition to the multi-position switch mentioned above) in the operators cab which controls the setting of auger fingers 8 in either one of their extreme positions as well as the drive reversal of the crop gathering and transporting parts. The electrical diagram of FIG. 5 basically comprises and schematically shows switch 50, two relays 52, actuator 38 and a drive reversing motor 54. In the full line position of switch 50, which corresponds to the full line position of relays 52, actuator 38 is energized via line 60 whereas the drive reversing motor 54 is energized via line 58. In order to reverse, switch 50 is switched over to its dashed line position, attracting relays 52, and energizing lines 56 and 62 to reverse the operation of actuator 38 and motor 54.

It will be clear from the foregoing that switch 50 simultaneously initiates both the retractable finger timing and the drive reversal. Limit switches 42 and 48 again are employed to switch off the current to actuator 38 when reaching an end-of-stroke position while, at that instant, drive motor 54 continues its operation. The relation between the mentioned multi-position switch and switch 50 is such that the former may override the operation of the latter, meaning that even during an unplugging operation, the finger timing still may be adjusted.

As an alternative, the electrical diagram of FIG. 5 may readily be rearranged such that actuation of the switch 50 allows fingers 8 to reverse completely before the drive reversal of the motor 54 is initiated. The foregoing ensures that retractable fingers 8 have reached their optimum working position before drive reversal takes place, resulting in an immediate impact of fingers 8 on the unplugging operation.

Although the present invention mainly has been described in connection with a pick-up device for a forage harvester, it will be appreciated that the invention should not be limited thereto but can be employed on any kind of crop gathering or harvesting attachment and/or header using an auger-like conveyor with retractable fingers. For example, combine harvesters conventionally employ a header assembly comprising a sickle bar for severing the crop from the stubble and a crop consolidating auger provided with retractable fingers for assisting in the transfer of the crop towards a straw elevator. In this application, the correct timing of the retractable fingers is also essential and the need of reversing the drive of the gathering components for unplugging purposes occasionally is present as well. The same is true for baler pick-up arrangements that also use crop conveying augers with retractable fingers.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A crop gathering attachment comprising
   a rotatable auger-like conveyor for transporting crop material,
   drive means for rotating said conveyor,
   a stationary crank shaft mechanism enclosed in said conveyor and having a shaft portion disposed eccentrically and parallel relative to the rotational axis of said conveyor, and
   a retractable finger assembly comprising a plurality of finger members pivotally connected at their inner ends to said shaft portion and projecting outwardly through guiding members provided in the peripheral wall of said conveyor, the arrangement being timed such that due to the eccentric disposition of said shaft portion, said finger members are reciprocated relative to said conveyor wall upon rotation of said conveyor, thereby protruding from said wall at one side of said conveyor for projecting into said crop material and being retracted relative to said wall at the generally diametrically opposed side of said conveyor for releasing said transported crop, the improvement comprising
   actuator means operatively connected to said crank shaft mechanism for remotely controlling the position of said shaft portion relative to said conveyor under conditions where said drive means is rotating said conveyor for transporting crop material, thereby varying the timing of said finger members.

2. A crop gathering attachment as set forth in claim 1 wherein said drive means drives said conveyor in a first direction to transport crop material in a normal operating direction and in a second direction to transport crop material in the opposite direction.

3. A crop gathering attachment as set forth in claim 2 wherein said actuator means controls the position of said shaft portion relative to said conveyor axis under conditions where said drive means is rotating said conveyor for transporting crop material is said opposite direction, thereby varying the timing of said finger members.

4. A crop gathering attachment as set forth in claim 1 wherein said actuator means comprises means for varying the timing of said fingers over an infinite number of positions.

5. A crop gathering attachment as set forth in claim 3 wherein said actuator means comprises means for varying the timing of said fingers over an infinite number of positions.

6. A crop gathering attachment as set forth in claim 4 wherein said actuator means further comprises a linear actuating device and means coupling said actuating device to said shaft portion.

7. A crop gathering attachment as set forth in claim 5 wherein said actuator means further comprises a linear actuating device and means coupling said actuating device to said shaft portion.

* * * * *